Oct. 16, 1934.   R. C. GRASEBY   1,976,880
SELF STARTING SYNCHRONOUS MOTOR
Filed Sept. 15, 1933
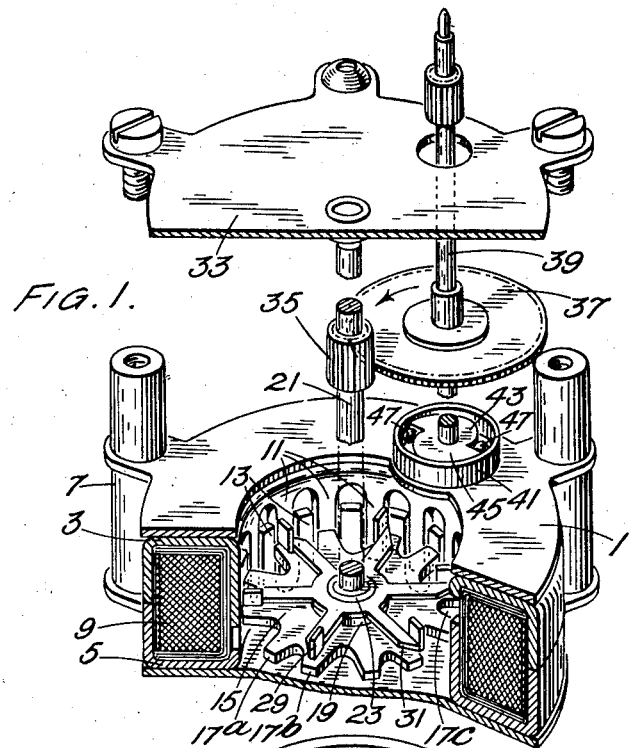
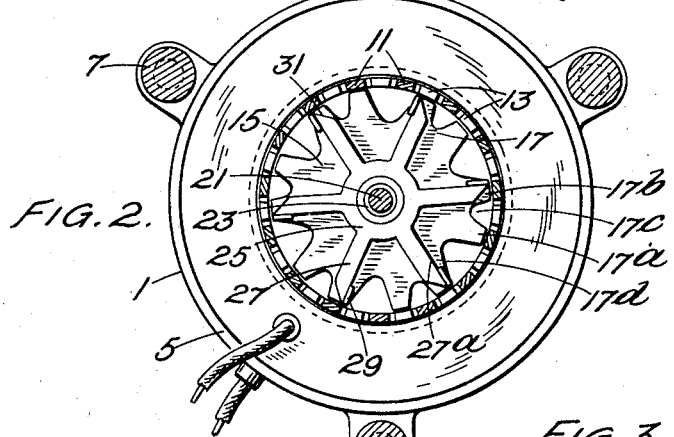
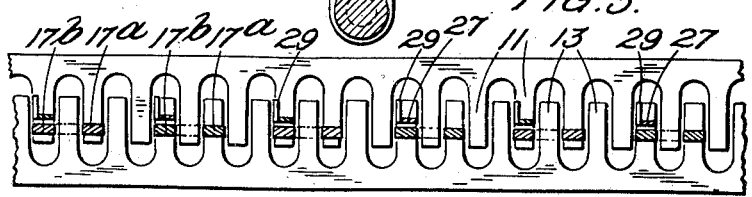

Patented Oct. 16, 1934

1,976,880

UNITED STATES PATENT OFFICE 1,976,880

SELF-STARTING SYNCHRONOUS MOTOR

Robert Constantine Graseby, New Malden, England

Application September 15, 1933, Serial No. 689,670
In Great Britain September 26, 1932

8 Claims. (Cl. 172—275)

This invention is concerned with small single-phase self-starting synchronous motors which are adapted for use in connection with time-switches, clocks and like apparatus.

It is usual to make synchronous motors self-starting by the addition of means to give a shaded pole effect but this has the disadvantage that the effective torque of the motor is much reduced. One object of the present invention is to improve the efficiency of small single-phase self-starting synchronous motors by obtaining adequate self-starting without the use of means that reduces the practical effective torque. Preferably the rotor comprises a permanent magnet and a spider of soft iron separated magnetically from the polarized magnet.

The invention will become more fully apparent from the following description, in conjunction with the accompanying diagrammatic drawing, of one construction illustrative of the invention.

In the drawing,

Fig. 1 is an exploded perspective diagram partly in section of the chief parts of the illustrative construction;

Fig. 2 is a plan view, partly in section of certain parts shown in Fig. 1; and

Fig. 3 is a development of the stator poles indicating their relationship to the magnet and the spider.

The construction now to be described is for use on a circuit having a frequency of 50 cycles per second. It comprises a stator indicated generally at 1 which is built up of two co-axial halves (formed as flanged soft-iron rings) 3 and 5 fixed to a frame indicated generally at 7. The winding of the stator is formed as a coil 9 which is embraced between the halves. Each half of the stator is provided on its interior with teeth (as 11 and 13) projecting towards the other half, the teeth of one half interdigitating with those of the other half. When the winding 9 is connected to the power supply the teeth 11 of one half stator are at any instant all of the same polarity and the teeth 13 of the other half stator are all of a polarity opposite to that of the teeth 11. In this particular construction the stator has fifteen pairs of poles.

The rotor comprises a permanent disc-magnet 15 having (in this illustrative construction) three pairs of poles 17, each pole being divided into two sub-poles 17a and 17b by a recess 17c, both sub-poles being of course of the same polarity. In this particular construction each pole 17 (two sub-poles) has an overall width about equal to the overall width of two adjacent teeth (poles) 11 or 13 of one half stator, so that (in a certain position, see Fig. 2) the two similarly-polarized sub-poles 17a and 17b face two similarly-polarized stator poles 11 while the recess 17c faces a stator pole 13 of opposite polarity to the polarity of the other two stator poles 11. The magnet 15 is carried on a brass drum 19 fixed to a rotor shaft 21. In the present case this drum 19 has upon one side of the magnet 15 a spigot 23 upon which is fixed (spaced from the magnet) a carrier for magnetic elements which carrier takes the form in this particular construction of a soft-iron spider 25 having six arms 27 projecting radially at 60° and each having one side 27a closely adjacent to one side 17d of a pole 17. Each arm 27 is of a width about the width of a sub-pole 17b; each arm 27 has at its outer end a small lug (element) 29 which lies at right angles to the arm 27 and projects away from the magnet 15 as clearly shown in Fig. 1. The corner of the arm 27 opposite the lug 29 is "backed off" at 31. In this construction the length of the lug 29 is about equal to the width of a sub-pole and the radial depth of the lug is somewhat less than its width.

In order to constrain the motor always to start in the same direction a practically frictionless check is provided. In the present construction this check takes the form of a ball clutch. A bracket 33 is fixed to the stator frame 7 and acts as a support for the rotor shaft 21. The rotor shaft 21 carries a small gear wheel 35 which meshes with a large gear wheel 37 carried on the lower end of a secondary shaft 39. On top of the stator is fixed a collar 41 provided with a cylindrical recess 43; fixed to the secondary shaft 39 is a double snail 45 which fits into the recess 43; between the snail 45 and the peripheral wall of the recess 43 are balls 47, which if desired may be biased by light springs. The slope of the snail 45 is such that there will be no tendency for the balls 47 to bind. The thickness of the snail relatively to the size of the ball should be such that surface tension between these parts and any oil that may be present should not be sufficient to prevent adequate action of the ball. The arrangement is such that if the rotor starts in a clockwise direction it is free to rotate; if it starts in a counter-clockwise direction it will be checked, but as there will be a rebound a tendency to rotate in a clockwise direction will be produced.

The weight of the rotor is so small that it is adapted to commence running as soon as current is switched on to the stator, provided that there is a resultant force tending to rotate it; in other words, the moment of inertia of the rotor is such that appreciable movement can take place before the reversal of the current cycle takes place. It is to be observed that the weight of the rotor should be calculated according to the frequency of the current.

The operation is as follows:—When the motor is not in use the stator 1 and the spider 25 are not magnets, and accordingly the rotor will take up a position due to the attraction of the disc magnet 15 to the iron of the stator. When current is switched on to the stator the teeth 11 and 13 of the latter become polarized (in a sense that depends on whether the positive or negative portion of the wave form is first active) and the ends of the spider arms also become magnetized (due to the pulsating flux in the stator) and as the spider magnetism acts to reinforce or oppose the effective flux through the adjacent stator pole, the distribution of the total flux will be distorted and movement of the rotor takes place and so the rotor commences to rotate.

A small motor so constructed will for practical purposes start to rotate immediately current is switched on to the stator; further, when rotating there is for practical purposes no appreciable friction or dragging effect due to the only supplementary device, the check. Thus the effective running torque of the motor is practically not reduced by the supplementary device. The efficiency of such a motor is considerably higher than that of single-phase self-starting synchronous motors at present in use and the starting is extremely certain and sweet.

In the foregoing a permanent magnet rotating in an alternating current field has been described, but a similar result might be produced by other arrangements that would produce what in effect is polarization.

It is to be observed that the rotor should not be overweighted. The weight of the rotor could be reduced, for example by using a three-armed spider, but it is found that a six-armed spider gives better results if the other weights are properly adjusted.

What I claim is:—

1. Small single-phase self-starting synchronous motor without shaded poles, comprising a magnetizable stator with salient poles, a coil wound upon said stator and energizable to magnetize said poles with alternate polarity, a light polarized magnet rotor with several pairs of salient poles of alternate polarity, and elements of magnetic material fixedly mounted adjacent to the rotor-poles to rotate therewith, each such element being asymmetrically disposed in relation to the adjacent rotor-pole in such manner that upon energization of the stator winding said elements move the light rotor from its position of rest and set it in rotation.

2. Small single-phase self-starting synchronous motor, comprising a soft iron stator with non-shaded salient poles, a stator-coil energizable to magnetize said poles with alternate polarity, a light permanent-magnet rotor with salient poles of alternate polarity, a rigid carrier fixedly mounted beside said rotor to rotate therewith, and elements of magnetic material mounted peripherally upon said carrier and adjacent to but asymmetrically of the rotor-poles.

3. Small single-phase self-starting synchronous motor comprising a wound stator with non-shaded salient poles, a light polarized-magnet rotor with salient poles, and at least one element of magnetic material mounted to rotate with said rotor and disposed adjacent to but asymmetrically of the poles of the latter so as to render said rotor unbalanced magnetically.

4. Small single-phase self-starting synchronous motor, comprising a wound stator with non-shaded salient poles, a light polarized-magnet rotor which has salient poles and is provided with an asymmetrical element which renders it unbalanced magnetically, a rotatable part operatively connected with said rotor, and mechanical check means operative upon said part to prevent rotation of the rotor in one direction whilst permitting rotation in the other direction without appreciable obstruction.

5. Small single-phase self-starting synchronous motor, comprising a wound stator with non-shaded salient poles, a light polarized-magnet rotor which has salient poles and is provided with an asymmetrical element which renders it unbalanced magnetically, a rotatable part operatively connected with said rotor, and mechanical check means comprising a rolling element located between relatively inclined surfaces upon said part and a fixed part of the motor and operative to permit rotation in one direction only.

6. Small single-phase self-starting synchronous motor, comprising a soft iron stator with non-shaded salient poles, a stator-coil energizable to magnetize said poles with alternate polarity, a light permanent-magnet rotor with salient poles of alternate polarity, a carrier in the form of a rigid spider mounted beside said rotor to rotate therewith, and elements of magnetic material in the form of lugs located at the ends of the spider arms and arranged to project away from the adjacent poles of the rotor.

7. Small single-phase self-starting synchronous motor, comprising a soft iron stator with non-shaded salient poles, a stator-coil energizable to magnetize said poles with alternate polarity, a light permanent-magnet rotor with salient poles of alternate polarity, and a soft iron spider mounted beside said rotor to rotate therewith and having arms each of which is of a width less than half the width of the adjacent rotor-pole and is located adjacent to one side of the said pole.

8. Small synchronous motor according to claim 7, wherein each spider arm is backed off at that end-corner which is nearer the middle of the adjacent rotor pole.

ROBERT CONSTANTINE GRASEBY.